July 15, 1958 W. L. SMITH ET AL 2,843,068
SEED TAPE PLANTER

Filed April 6, 1956 2 Sheets-Sheet 1

INVENTORS.
WARREN L. SMITH
FRANK J. SMITH
BY R. W. Hodgson

July 15, 1958  W. L. SMITH ET AL  2,843,068
SEED TAPE PLANTER
Filed April 6, 1956  2 Sheets-Sheet 2
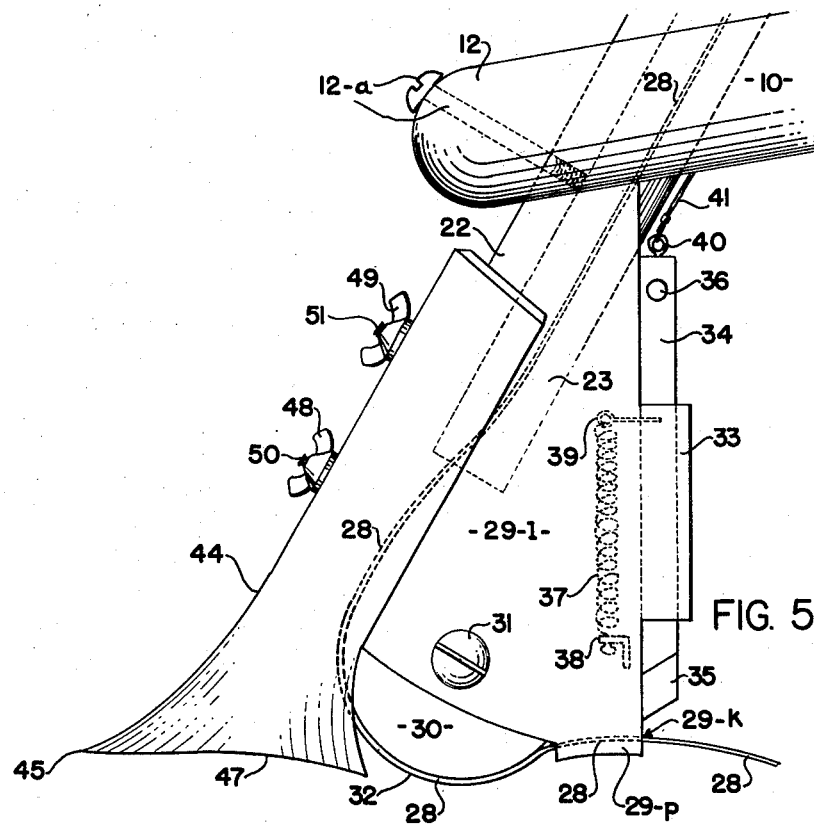
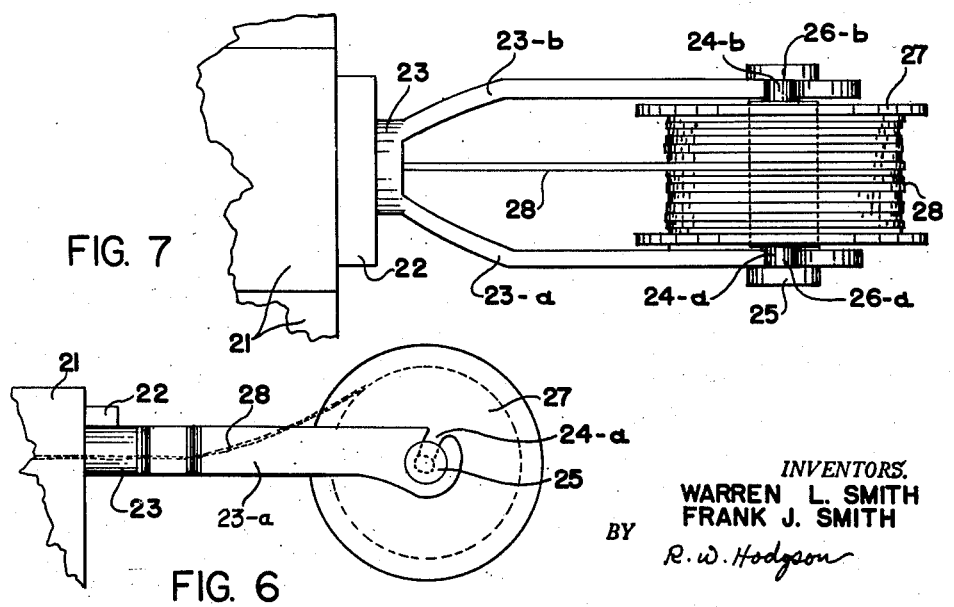
INVENTORS.
WARREN L. SMITH
FRANK J. SMITH
BY R. W. Hodgson

United States Patent Office 2,843,068
Patented July 15, 1958

2,843,068
SEED TAPE PLANTER

Warren L. Smith, Powell, Wyo., and Frank J. Smith, Steilacoom, Wash.

Application April 6, 1956, Serial No. 576,661

1 Claim. (Cl. 111—5)

This invention relates to devices and methods for the large scale planting of garden seeds and, more particularly, to a device for performing all of the operations involved in planting seed tape.

Although work on the development of seed tape has been intermittent and scattered it has recently gained new impetus from the various products, which have reached the market, that serve to stimulate the growth and prevent infestation of young plants. Many of these products are available in forms in which they may be impregnated into the tape itself or may be spotted around or adjacent each seed when the seeds are folded into the length of tape.

Paper mills, also, have contributed to the advancement of this planting technique, and through the use of long fiber pulps have produced tapes with inordinately high tensile strength and high resistance to tear which may be handled with much more speed and freedom than the fragile tapes heretofore available.

There can be little doubt but that the combined conveniences of planting the nutrients and protective elements along with the seed, together with the more obvious physical advantages of obtaining relatively straight rows with the plants evenly spaced in a strong, easily handled tape, will create broad acceptance of the seed tape method of planting in the immediate future.

It was with the foregoing considerations in mind that we have made the present invention which can be seen to have a number of important objectives.

One important object of our invention is the provision of a device which can be operated easily by one person and will simultaneously perform a plurality of operations including opening a planting furrow, positioning the seed tape in the furrow and closing the furrow over the tape.

Another important object of our invention is the provision of a device adapted to support a substantial quantity of tape and ration it progressively and automatically without imposing critical tear or tension stresses.

A further important object of this invention is the provision of a device adapted to cut off the tape at any desired point, such as: the end of a furrow.

A still further important object of this invention is the provision of a device of the character described which may be adapted with suitable engine power or may be horse drawn.

An additional important object of our invention is the provision of a planting device of the character described adapted with inherent means for disengaging the furrow opening means from contact with the ground at any desired point.

And a still further object of our invention is the provision of a device as previously set forth adapted with means for adjusting the furrow opening means relative to the elevation at which the handles of the device are held by the operator.

In brief, our invention of a seed tape planter includes a main structure similar to a wheel barrow having a large wheel positioned between two diagonally disposed tubular members which are joined forwardly of the wheel and adapted to serve as handles at their spaced ends. Depending from the jointure of the tubular members is a small wheel, and forwardly of the small wheel is a V-shaped stem piece adapted to dig into the ground and open a furrow as the large wheel is pushed along the ground. A spool of seed tape, rotatably disposed above the large wheel, is fed forwardly around and under the small wheel, and thence under the large wheel which is provided with concave side flanges which, together with (or as a substitute for) a simple drag member may be drawn rearwardly of the large wheel to replace the earth and cover the tape in the bottom of the furrow. A spring tensioned blade, adjacent the small wheel, is actuated by a releasing lever on one of the handles to sever the tape when desired.

Other important objects of this invention will be apparent in the following detailed description of one preferred embodiment when it is read with reference to the accompanying drawings in which:

Figure 5 is a side elevational view, similar to that of Figure 4, showing the manner in which the stem piece and small wheel are supported by the tubular frame;

Figure 6 is a fragmentary enlargement from Figure 1 showing an elevational view of the tape spool, and Figure 7 is a similar fragmentary enlargement taken from Figure 2 showing a plan view of the tape spool seen in Figure 6.

Figure 1:
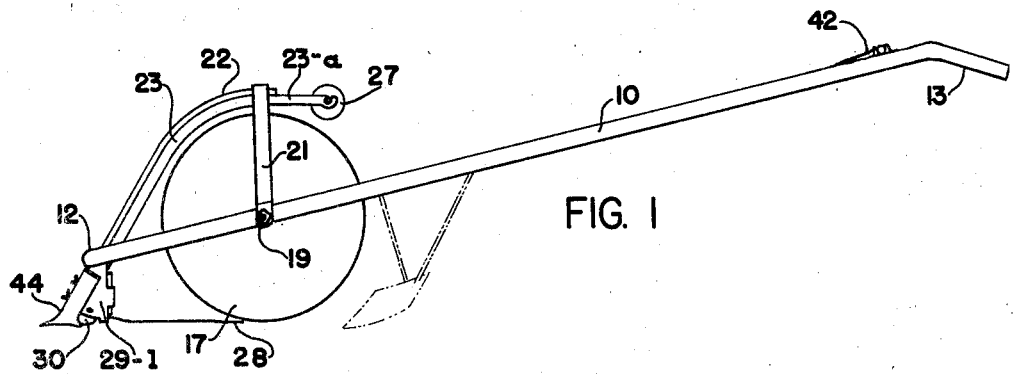
Figure 1 is a diagrammatic side elevational view of a seed tape planter constructed in accordance with our invention.

Reference is again made to Figures 1 and 2 in which the numerals 10 and 11 designate two generally tubular longitudinal members joined to form an acute V at the apex 12 and terminated at their opposite ends in handle portions 13 and 14. The crossed diagonal braces 15 and 16 hold the tubular members 10 and 11 in spaced coplanar positioning.

Figure 2:
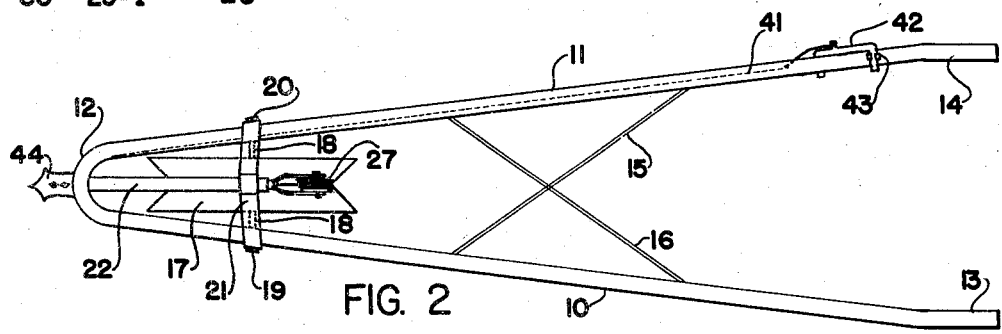
Figure 2 is a plan view showing the relative positioning of the parts of the seed planting device in a generally horizontal plane.

A large wheel 17 is mounted on an axle 18 in Figure 2, which is journalled in the longitudinal members 10 and 11 at 19 and 20 so that the wheel 17 is free to rotate inwardly of the jointure apex 12.

The circumferential periphery of the large wheel 17 is concavely conformed, being of increased diameter at the sides and reduced diameter intermediate thereof, and in one preferred form the wheel is comprised of a pair of circular discs each having extended from one side thereof a circumferential flange concavely conformed to a quarter-circular sectional profile. These discs are mounted on the axle means 18 with their concave flanges inwardly disposed adjacent each other, and adjustable spacing means are provided therebetween by which they are spaced relatively along the axle 18.

An arcuate stem strap 22 having a tube 23 attached to its inner side, as may be seen in Figures 1 and 4–7, is rigidly supported forwardly of the wheel 17 by a generally vertical yoke member 21 which is attached to the ends 19 and 20 of the axle 18, and by the bolt 12–a entered through the apex 12 at the jointure of the longitudinal members 10 and 11, as best seen in Figure 5.

The tube 23 is extended outwardly beyond the point of attachment of the stem member 22 with the vertical yoke 21, and is notched and conformed to provide spaced parallel vertically disposed plates 23–a and 23–b as seen in Figures 6 and 7 having diagonal slots 24–a and 24–b opening downwardly from their upper edges.

A roller 25, best seen in Figure 7, is provided adjacent each end with sections of reduced diameter 26–a and 26–b dimensioned to fit rotatably within the slots 24–a and 24–b, as is clearly shown in Figures 6 and 7, and a spool 27 carrying a supply of seed tape 28 is, in turn, rotatably mounted on the roller 25 so that it is retained but free to rotate between the parallel plates 23–a and 23–b. The leading end of the tape 28 is entered into and fed downwardly through the tube 23.

The stem strap, 22, below its point of attachment to the apex 12 by means of the bolt 12–a, is fitted with skirted side members 29–l and 29–r between which a small wheel 30 is rotatably mounted on a bearing member 31 entered through each of the side members. The outer edge 32 of the small wheel 30 is concavely conformed to keep the tape 28 centered therein after it leaves the lower end of the tube 23 as indicated in Figure 5.

Both of the side skirts, 29–l and 29–r, are extended rearwardly as seen at 33 in Figure 5, then bent inwardly and joined in a vertical seam as also are the portions of the sides above and below the extension 33 and extensions at the bottom designated as 29–p in Figures 4 and 5. In this manner the extended portion 33 being open at the top and bottom acts as a retaining sleeve holding the tape cutting bar 34 in a substantially vertical position with its tapered and bevelled edge 35 directly above the tape 28. A stop member 36 is extended outwardly from each side of the cutting bar 34 to engage the top of the extension 33 when the bar 34 has completed its downward cutting stroke. Tension means consisting of a coil spring 37 disposed between a bracket 38 attached to the structure and an eye-bolt 39 extending from the cutting bar 34, biases the bar to the downward position.

Figures 3, 4:
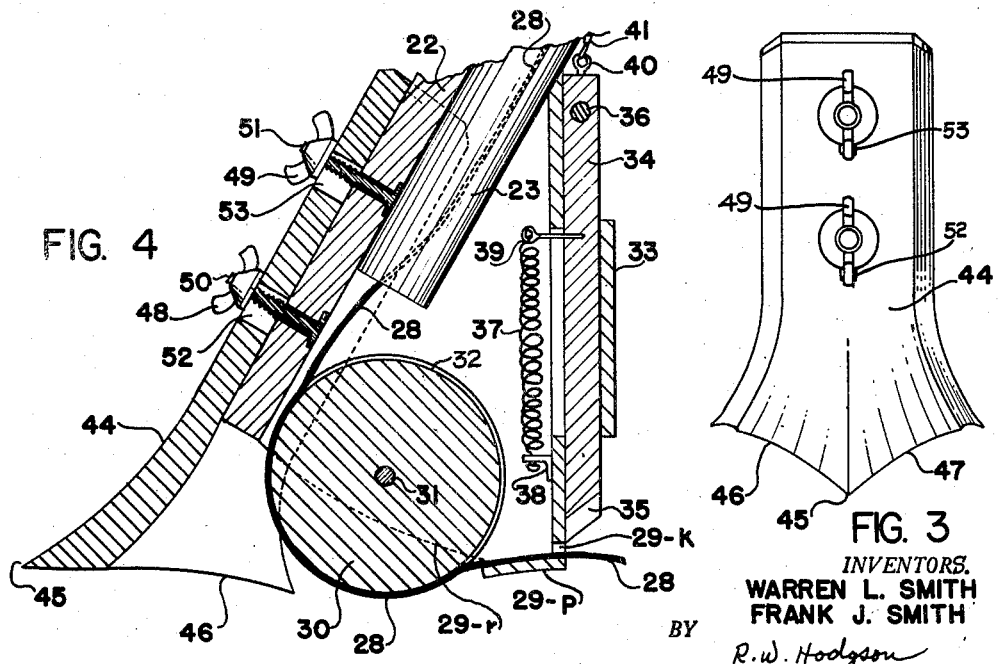
Figure 3 is a diagrammatic frontal elevational view of the furrow opening stem piece.
Figure 4 is a side elevational view in longitudinal section of the stem piece seen in Figure 3, shown together with the adjacent small wheel and tape cut-off mechanism.

The cutting bar 34 is held upwardly against the tension of the spring 37 in the position shown in Figures 4 and 5 by means of a flexible cable 41 attached to the top of the bar as at 40, then run rearwardly through the tubular member 11 as shown in Figure 2, and attached to a simple hand lever 42 which, when drawn backwardly toward the handle 14 and secured by the spring catch 43, holds the bar 34 upwardly against the tension of the spring 37.

The upward positioning of the cutting bar 34 is maintained while the device is in operation and the rotation of the small wheel 30 is drawing the tape 28 downwardly through the tube 23.

A furrowing member 44, is attached to the downward frontal end of the stem strap 22 by means of wing nuts 48 and 49 engaging the bolts 50 and 51 disposed through vertical slots 52 and 53 in the furrowing member 44. As can be understood from the frontal view of the furrowing member in Figure 3, and the sectional view in Figure 4, the furrowing member is conformed to a sharp outwardly extending point 45, and the sides 46 and 47 are flared out laterally therefrom, so that the point digs into the earth and the flared sections 46 and 47 move the earth to each side. The slots 52 and 53 and the wing nuts 48 and 49 are provided to permit vertical adjustment of the furrowing member 45 on the stem strap 22 to any position relative to the bottom of the small wheel 30.

Operation of the device in actual use is quite simple. A spool of seed tape is positioned on the roller 25 between the parallel plates 23–a and 23–b and the tape 28 is entered into, and threaded downwardly through, the pipe 23, then around and under the small wheel 30, over the transverse plate 29–p at the bottom of side skirts 29–l and 29–r, then outwardly and rearwardly through the slot 29–k above the plate 29–p adjacent the cutting edge 35 of the cutting bar 34.

The small lever 42 is drawn backwardly toward the handle 14 and secured by the latch 43, thus holding the cutting bar upwardly and clear of the tape 28. The furrowing member 44 is moved upwardly or downwardly on the step strap 22 according to the depth of the furrow desired and the average height at which the handles 13 and 14 will be supported. The planter may be rolled along the ground to the location at which planting is to be started without feeding the tape by lowering the handles 13 and 14 and thereby raising the small roller 30 above the ground.

When the tape is to be planted, the handles are elevated to the predetermined height and the device is rolled along the line to the end of a furrow. At this point, the latch 43 is released and the tape is severed instantly by the rapid descent of the cutting bar 34. As has been mentioned, supplementary drag members may be attached to the frame assembly of the device to replace and level off any dislodged earth.

Numerous modifications and variations of the present invention will occur to those skilled in the art after a careful study hereof. All such, properly within the basic spirit and scope of the present invention are intended to be included and comprehended herein as fully as if specifically described, illustrated and claimed herein.

The exact compositions, configurations, constructions, relative positionings, and cooperative relationships of the various component parts of the present invention are not critical, and can be modified substantially within the spirit of the present invention.

The embodiment of the present invention specifically described and illustrated herein is exemplary only, and is not intended to limit the scope of the present invention, which is to be interpreted in the light of the prior art and the appended claim only, with due consideration for the doctrine of equivalents.

We claim:

A device for planting seed tape, comprising: a generally V-shaped frame assembly including two longitudinally extended diagonally disposed side members adjoined at an apex and adapted with handle portions at their spaced ends, and a plurality of brace members disposed diagonally between said side members to hold them in rigid coplanar spaced positioning; axle means journalled in said side members adjacent said jointure apex thereof, and a large wheel mounted on said axle being rotatable within said frame; an arcuate stem bracket member supported above and forwardly of said large wheel and fixedly attached to said frame assembly at the apex thereof, said bracket being adapted with parallel skirt members having journal means therein; a small pilot wheel disposed between said skirt members and journalled therein; a furrow opening blade member having a downwardly disposed V-shaped edge movably attached to said bracket member on the side thereof spaced from said large wheel and said pilot wheel; means for carrying and feeding seed tape under said pilot and said large wheels comprising; a tube disposed inwardly of said bracket and having one aperture disposed adjacent said small wheel, and being adapted at its other end with a pair of parallel side plates having slots disposed diagonally inwardly from the upper edges thereof, a spindle member having circumferential areas of reduced diameter adjacent each end interfitting with said slots, a spool member having a quantity of seed tape wound thereon rotatably mounted on said spindle between said plates, the outer end of said tape being threadable through said tube and under said small pilot wheel and rearwardly under said large wheel; means for severing said seed tape comprising; a generally vertical channel having a shearing plate at the bottom thereof being disposed between said skirt members rearwardly of said small wheel, a cutting bar disposed in said vertical channel, spring means biasing said cutting bar downwardly in said channel, linkage means, terminated in a releasable lever adjacent one of said handle portions of said frame assembly, adapted to hold said cutting bar upwardly in said channel against said spring tension biasing means, and guide means adapted to lead said tape across said shearing plate at the bottom of said channel; means for adjusting the position of said blade member relative to the downwardly disposed surfaces of said wheels comprising; a plurality of superposed perforate slots in the shank portion of said blade member, a plurality of threaded stud members extended outwardly from said bracket member in substantially uniplanar alignment with said small and large wheels, said stud members being receivable in said slots and having wing nuts threadable thereon; and a circumferential groove dimensioned to receive said tape therein disposed in the outer edge of said small wheel, said groove having oppositely tapered sides terminated outwardly adjacent the sides of said wheel.

References Cited in the file of this patent

UNITED STATES PATENTS

| | | |
|---|---|---|
| 851,170 | Israel | Apr. 23, 1907 |
| 1,292,082 | Sanford | Jan. 21, 1919 |
| 1,750,054 | Rosso | Mar. 11, 1930 |
| 2,496,885 | Milton | Feb. 7, 1950 |